3,663,569
PROCESS FOR PREPARING CYCLIC CARBONATES
FROM POLYHYDRIC ALCOHOLS
Baak W. Lew, Wilmington, Del., assignor to Atlas
Chemical Industries, Inc., Wilmington, Del.
No Drawing. Filed Sept. 2, 1969, Ser. No. 854,752
Int. Cl. C07d *13/04, 13/06, 15/04*
U.S. Cl. 260—340.2                                         2 Claims

ABSTRACT OF THE DISCLOSURE

Polyhydric alcohol cyclic carbonates are prepared by the transesterification reaction of a polyhydric alcohol of at least four carbon atoms containing at least four hydroxyl groups with a dialkyl or diaryl carbonate in the presence of a dialkyl or diaryl tin oxide catalyst.

---

This invention relates to an improved process for making polyol cyclic carbonates. In particular, the process concerns the reaction of polyols and organic carbonates by transesterification to form mono-, di-, and polycyclic carbonates of polyhydric alcohols.

Cyclic carbonates are old in the literature, with the alkaline or acid catalyzed reaction of propane diol and diols of greater molecular weight with organic carbonates disclosed in U.S. Pat. No. 1,995,291. U.S. Pat. No. 2,799,616 teaches that alkaline conditions are essential to the progress of the carbonating reaction. By a carbonating reaction is meant the reaction of an organic carbonate such as diethyl carbonate with a polyhydric alcohol such as glycerol to form a cyclic carbonate and free ethyl alcohol. Although glycols have been carbonated without much difficulty, polyhydric alcohols of greater functionality have been harder to react and researchers have had to resort to solvents such as molten resorcinol, dimethylformamide or dimethyl sulfoxide to achieve the desired reaction. There have also been repeated reports of the incompatibility of polyols containing more than 4 hydroxyl groups and the alkyl or aryl carbonates used in these reactions causing the alleged necessity of solvents. Furthermore, under the alkaline conditions previously favored for this reaction, the carbonates are not formed successfully but rather an anhydro product is formed with the evolution of $CO_2$. The solvent contamination and the anhydrizing side reaction naturally result in an impure product.

It is an object of this invention to provide an improved process for carbonating higher polyhydric alcohols.

It is also an object of this invention to prepare pure cyclic carbonates of polyhydric alcohols.

Other objects of this invention will become apparent to those skilled in the art in view of the following detailed description.

The process of this invention comprises reacting a polyhydric alcohol containing at least four carbon atoms and at least four hydroxyl groups with a dialkyl or diaryl carbonate in the presence of dialkyl or diaryl tin oxide catalyst; thus forming the cyclic carbonate of the polyhydric alcohol and also generating an alcohol or phenol.

The process of this invention can be successfully run with or without the use of a solvent. Where a solvent is used solvents such as dimethylformamide or dimethylsulfoxide may be used. In a preferred process of this invention no solvent is used.

The catalyst system used in this process maintains a neutral pH thereby overcoming the usual anhydrization tendencies inherent in the prior art. The catalyst concentration may range from about .05 to about 4.0 weight percent of the reaction mixture with a preferred range of about 0.10 to about 2.0 weight percent. At concentrations below .05 weight percent the catalyst becomes ineffective. At concentrations above 4.0 weight percent the reaction proceeds; however, the excess catalyst does not enhance the reaction sufficiently to make it economically justifiable. However, higher concentrations result in a rapid reaction and equally good product. Concentrations as high as 10% perform adequately. To achieve the most desirable product and keep the process under the most favorable control, a preferred catalyst concentration is from about 0.1 to about 1.0 weight percent of the reaction mixture. Examples of catalysts which can be used in this reaction are dimethyl tin oxide, dibutyl tin oxide, diethyl tin oxide, dioctyl tin oxide, didecyl tin oxide, diphenyl tin oxide, dicresyl tin oxide and other similar dialkyl or diaryl tin oxides. A preferred group of dialkyl catalysts contain from 2–14 carbon atoms with dibutyl tin oxide being the most favored.

The temperature range of this process is from about 80 to about 160° C. The upper limit denotes the level at which the reaction can be maintained without appreciable degradation. The lower level is less critical and merely limits the zone within which the reaction will proceed at reasonable rates. To achieve the best results, i.e., a high purity product and a good reaction rate, the preferred temperature range was found to be about 100 to 140° C.

Although pressures about atmospheric can be used for the process reduced pressures are preferred. If the pressure is allowed to become too great, the reaction will proceed slowly. This would result in excessively long reaction times, the loss of yield and an uneconomical reaction. Therefore, pressures are usually kept at or below about 500 mm. of mercury (absolute). The volatility of the reactants in this reaction results in a lower pressure limit of 15 mm. of mercury (absolute). If the pressure is lower than this, reactant bumping over and loss of product yield will be prevalent. The preferred pressure range for this process is from about 20 to about 200 mm. of mercury (absolute) thus assuring proper reaction control and no loss of reactants during the course of the reaction.

As one would expect, the pressure and temperature interact in this process and care should be used to select a proper combination for achieving best process results. Thus the pressure and the temperature must be selected to allow distillation of the alcohol or phenol generated during the reaction and yet not so great as to cause a bumping over of reactants, or a degradation of the products. Therefore, although high temperatures and very low pressures and high temperatures and high pressures can be used, in general they do not yield the best product because of degradation of reactants, the risk of a run away reaction and generation of anhydrized products in the latter case, and in the former case of bumping over.

Some of the polyhydric alcohols which may be used in this process are erythritol, pentaerythritol, xylitol, threitol, sorbitol, mannitol, iditol, 1,2,5,6-hexanetetrol, 1,2,3, 5,6-hexanepentol, lactitol, maltitol, melibiitol raffinitol, other similarly reduced polysaccharides, sorbitan, mannitan and other hexitans, maltose, glucose, sucrose and other sugars. Carbonates exemplary of those used in this process are diphenyl carbonate, dibutyl carbonate, diheptyl carbonate, di-isobutyl carbonate, dicresyl carbonate, dixylenyl carbonate and other diaryl and dialkyl carbonates.

In a preferred practice of this invention the polyhydric alcohol contains from 4–10 hydroxyl groups, the carbonate is aromatic and the catalyst if dialkyl contains from 2–14 carbon atoms or if aryl only two aromatic rings.

The reaction may be represented by the following general formula:

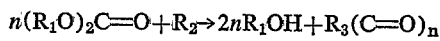

wherein $R_1$ is an alkyl or aryl radical, $R_2$ is a polyhydric alcohol, $n$ is the extent of carbonation to be achieved and $R_3$ is a multivalent residue of a polyhydric alcohol, that is a polyhydric alcohol with hydroxyl hydrogens removed. A tetrafunctional hexitol residue would be

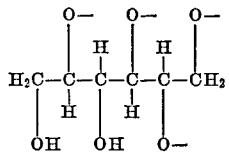

In the case of the above tetravalent hexitol residue $n$ would be 2 and the carbonate may be represented by the following structural formula:

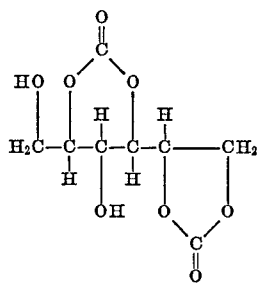

In practicing this invention the moles of carbonate per mol of polyol equal the degree of carbonation desired; therefore if a dicarbonate is desired, two mols of organic carbonate are added per mole of the polyhydric alcohol. If the two mols of diphenyl carbonate and 1 mol of sorbitol are reacted, the reaction product is a mixture of mono-, di-, and tricarbonates with the dicarbonate predominating. The range of $n$, mols carbonate to polyol, is preferably between 2 and 8 in practicing this invention.

From a crude product individual carbonates can be recovered. The dicarbonate produced above can be separated from the reaction product by several techniques such as recrystallization, solvent extraction, chromatographic techniques and other separation techniques familiar to those skilled in the art.

Non limiting examples of carbonates that can be prepared by this invention in good yields may be represented by formulae: (a) through (g) below:

(a) 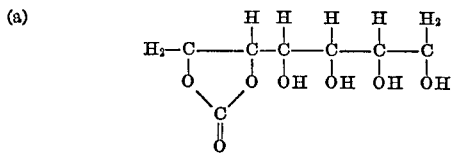

(b) 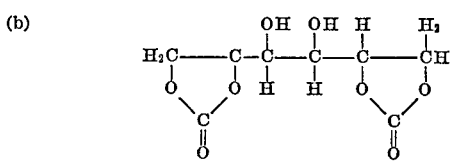

(c) 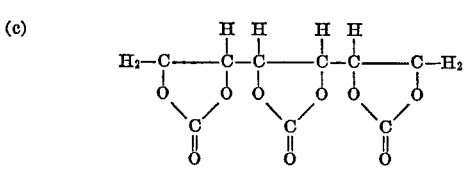

(d) 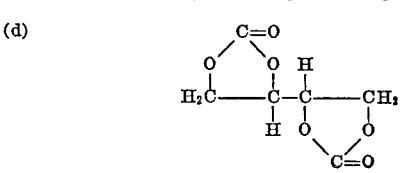

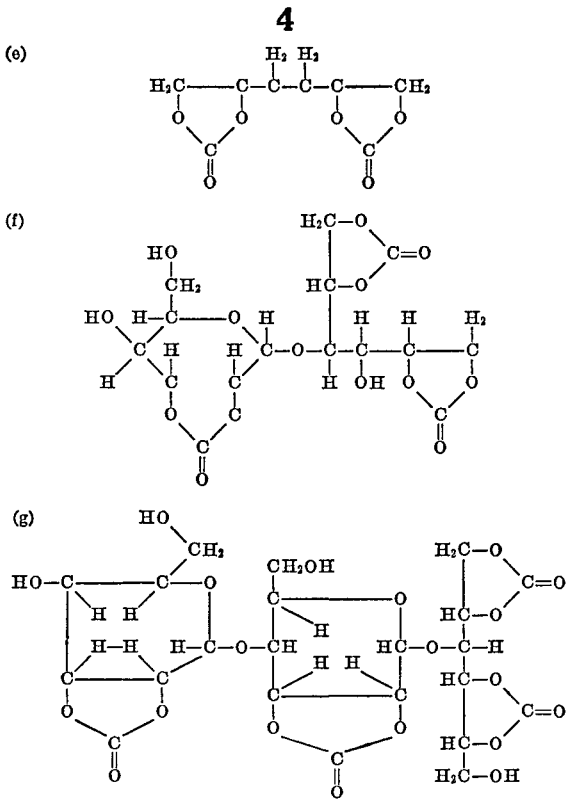

These carbonates can be used in their crude form or purified form as valuable polyfunctional intermediates. They form, when reacted with polyfunctional amines, such as diethylene triamine, linear polyurethanes which when methylolated by reacting the polyurethanes with formaldehyde form compounds which are excellent fabric conditioners enhancing crease resistance and softness of the fabrics.

To better enable one skilled in the art to carry out this invention the following nonlimiting examples are presented. In these examples all percentages are by weight unless otherwise specified.

EXAMPLE 1

To a three neck flask equipped with a stirrer is added 364.2 grams (2 moles) of sorbitol, 428.4 grams (2 moles) of diphenyl carbonate, and 4 grams of dibutyl tin oxide. The mixture is heated, with stirring, to 138° C. at a pressure of 50 mm. of mercury (absolute). This temperature is reduced to 117 to 120° C. after a short period with the reaction then continuing for an additional 3.5 hours. The pressure is then reduced to 30 mm. of mercury (absolute) and the reaction continued for another 1.5 hours at which time the stoichiometric amount of phenol has been flashed off. The reaction mixture is cooled to 100° C. and diluted with 300 ml. of water. To this mixture is added with stirring 4.3 grams of powdered activated carbon. The digested carbonate, carbon, and catalyst mixture is then filtered hot to remove the carbon and catalyst. The filtrate is concentrated to dryness to yield 413 grams of a semicrystalline nearly solid mixture of isomeric sorbitol monocarbonates. This product will analyze at 19.2% $CO_2$ with an OH number of 1078.

One isomer monocarbonate, 81 grams, is separated from this mixture by recrystallization from a methanol slurry. The analysis of this product is: an OH number of 1082, a $CO_2$ content of 22.6%, carbon 40.58%, hydrogen 6.01% and the isomer melts at 158° C., with decomposition (pre-heated Fisher Johns Method).

EXAMPLE 2

Per the procedure of Example 1, a mixture of 182.2 grams of sorbitol (1 mol), 428.4 grams of diphenyl carbonate (2 mols), and 3 grams of dibutyl tin oxide, is heated to 139° C. at 50 mm. mercury (absolute) and then allowed to cool to 125° C. The reaction is continued for 3 hours at which time the pressure is reduced to 20 mm. of mercury for an additional 0.25 hour. At this point the stoichiometric amount of phenol has been removed and the reaction has gone to completion. The product yield is 220 grams of a balsam like solid which is a mixture of sorbitol dicarbonates and has the following analysis: OH number 524, $CO_2$ content of 34.4%. From this mixture 78 grams of sorbitol dicarbonate is fractionated by slurrying with 100 ml. of water and filtering the crystalline material from the mixture. This crystalline material is then dissolved in 850 ml. of hot water, concentrated and recrystallized to yield 19 grams of 1,2:5,6 sorbitol dicarbonate. The analysis is: OH number 471, $CO_2$ content of 37.3%, carbon assay 41.6%, hydrogen 4.5%. This product melts at 210° C., decomposing (pre-heated Fisher Johns method).

EXAMPLE 3

A mixture of 136.7 grams of sorbitol (0.75 mol), 482 grams of diphenyl carbonate (2.25 mols) and 3.1 grams dibutyl tin oxide are heated per the procedure of Example 1 at 150 to 140° C. for two hours at 50 mm. of mercury (absolute). The pressure is then reduced to 20 mm. of mercury (absolute) and the temperature lowered to 110° C. to 120° C. and the reaction is continued for an additional 0.5 hour. At this point the theoretical amount of phenol has been taken off and a quantitative yield of crude sorbitol tricarbonate obtained. This crude sorbitol tricarbonate is purified by adding 100 ml. of acetone. The filtration product, 165 grams, is then redissolved in 3300 ml. of hot acetone filtered and recrystallized to yield 133 grams of rod like crystals which melt at 201° C., decomposing, by the pre-heated Fisher Johns method. The product analysis is an OH number of 0, $CO_2$ 52.6%, total carbon 41.2%, and hydrogen 3.4%.

EXAMPLE 4

Per the procedure of Example 1, 45.5 grams of D mannitol, 107.1 grams of diphenyl carbonate, and 0.76 gram of dibutyl tin oxide are heated at 130 to 135° C. at a pressure of 50 mm. mercury for 5 hours. The product is a sticky semicrystalline material, obtained in theoretical yield.

A crystalline portion, 39 grams, is obtained by recrystallization from 25 ml. of acetone and then redissolving in and recrystallizing from 150 ml. of hot water yielded 27 grams of mannitol dicarbonate. The product has the following analysis: A hydroxyl number of 465, $CO_2$ content of 37.8%, a carbon content of 40.9% and hydrogen of 4.7%. It melts at 212° C., decomposing (pre-heated Fisher Johns).

EXAMPLE 5

A mixture of 164 grams of 1,4 sorbitan (1 mol), 242.3 grams of dicresyl carbonate (1 mol) and 2.1 grams of dioctyl tin oxide are heated with stirring under a pressure of 30 mm. of mercury (absolute) at a temperature of 120 to 150° C. for 3.5 hours. The reaction is continued at 120 to 125° C. and 20 mm. mercury (absolute) for an additional 2 hours. The product obtained in quantitative yield is a crystalline solid with a melting point of 225 to 229° C., decomposing (pre-heated Fisher Johns melting point).

Recrystallization from water yields 177 grams of rod like crystals, 1,4 sorbitan monocarbonate, with a melting point of 230 to 235° C., decomposing (pre-heated Fisher Johns), with the following analysis: hydroxyl number 589, $CO_2$ 23.4%, carbon 44.1%, and hydrogen 5.5%.

EXAMPLE 6

A mixture of 122 grams of erythritol (1 mol), 428.4 grams of diphenyl carbonate (2 mols) and 4.1 grams of dimethyl tin oxide is heated with stirring to 130° C. at a pressure of 30 mm. mercury for 4 hours. At this point the stoichiometric amount of phenol has been flashed off. The product was then recrystallized from 500 ml. of acetone and a white crystalline product, erythritol dicarbonate, is obtained. These crystals melt at 167 to 169° C. (pre-heated Fisher-Johns).

EXAMPLE 7

172 grams (0.5 mol) of maltitol, 428.4 grams (2 mols) of diphenyl carbonate, and 3.0 grams of diethyl tin oxide are heated, per Example 1, to 150° C. at 50 mm. of mercury (absolute), the reaction is allowed to proceed 3.5 hours at which time the pressure is lowered to 20 mm. mercury (absolute) and the temperature is lower to 130 to 135° C. When the theoretical amount of phenol has been distilled the reaction temperature is allowed to cool and the product, maltitol tetracarbonate, is separated from the catalyst by filtration in hot water.

EXAMPLE 8

Per the procedure of Example 1, 136.7 grams of sorbitol, 290 grams of dibutyl carbonate and 7 grams of dicresyl tin oxide are heated at 130–140° C. at a pressure of 60 mm. of mercury (absolute) for 6 hours, and then cooled to 110° C. and further reacted at pressure of 20 mm. of mercury (absolute) for an additional 2.5 hours. The product is a sticky balsam like material.

EXAMPLE 9

Per the procedure of Example 1, 136.7 grams of sorbitol, 310 grams of diethyl carbonate and 5 grams of diphenyl tin oxide are heated at 140–145° C. and 80 mm. of mercury absolute for 5 hours and then further reacting at a temperature of 100° C. at 25 mm. of mercury absolute for an additional 3 hours. The product is a sticky viscous mass.

These examples are only illustrative and with variation of reactants and conditions many other products within the spirit of this invention can be prepared by those skilled in the art.

I claim:

1. A process for the production of polyol cyclic carbonates which comprises reacting a polyhydric alcohol selected from the group consisting of erythritol, xylitol, threitol, sorbitol, mannitol, iditol, lactitol, maltitol, melibiitol, raffinitol, 1,2,5,6-hexanetetrol, hexitan, 1,2,4,5-pentanetetrol, and pentaerythritol with an organic carbonate selected from the group consisting of dialkyl and diaryl carbonates, in the presence of a catalyst selected from the group consisting of dialkyl and diaryl tin oxide and in the absence of a solvent, wherein the molar amount of said organic carbonate per mol of polyhydric alcohol is from 1 to 8 and wherein the reaction is carried out at a temperature maintained from 80° C. to 160° C. and at a pressure of from 15 to 500 ml. of mercury (absolute).

2. A process of claim 1 wherein the temperature is from 100° C. to 140° C., the pressure is from 20 to 200 mm. of mercury (absolute), the catalyst is dibutyl tin oxide at a concentration of 0.10 to 2.0 weight percent of the reaction mixture, and the carbonate is diphenyl carbonate.

References Cited

UNITED STATES PATENTS

| | | | |
|---|---|---|---|
| 2,787,632 | 4/1957 | Stevens | 260—463 |
| 2,890,208 | 6/1959 | Young et al. | 260—78.3 |
| 3,422,118 | 1/1969 | Hostettler et al. | 260—340.2 |

NORMA S. MILESTONE, Primary Examiner

U.S. Cl. X.R.

260—234 R

UNITED STATES PATENT OFFICE
CERTIFICATE OF CORRECTION

Patent No. 3,663,569                       Dated May 16, 1972

Inventor(s) Baak W. Lew

It is certified that error appears in the above-identified patent and that said Letters Patent are hereby corrected as shown below:

Column 4, formula (f), lines 8-19 should be deleted and replaced with the following formula:

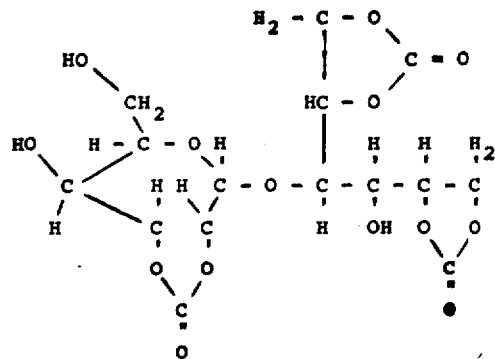

Signed and sealed this 21st day of May 1974.

(SEAL)
Attest:

EDWARD M.FLETCHER,JR.
Attesting Officer

C. MARSHALL DANN
Commissioner of Patents

FORM PO-1050 (10-69)